United States Patent [19]

Briccetti et al.

[11] Patent Number: 4,470,266

[45] Date of Patent: Sep. 11, 1984

[54] TIMER SPEEDUP FOR SERVICING AN AIR CONDITIONING UNIT WITH AN ELECTRONIC CONTROL

[75] Inventors: Mario F. Briccetti, Liverpool; Wayne R. Reedy, Cazenovia, both of N.Y.

[73] Assignee: Carrier Corporation, Syracuse, N.Y.

[21] Appl. No.: 362,780

[22] Filed: Mar. 29, 1982

[51] Int. Cl.³ .................... F25B 49/00; G05D 23/19
[52] U.S. Cl. .................................. 62/126; 62/158; 62/231
[58] Field of Search .................. 62/155, 234, 231, 157, 62/158, 125, 126; 236/46 R; 165/12, 11 R, 29

[56] References Cited

U.S. PATENT DOCUMENTS

| | | | |
|---|---|---|---|
| 4,151,723 | 5/1979 | Gardner | 62/155 |
| 4,299,095 | 11/1981 | Cassarino | 62/155 |
| 4,353,409 | 10/1982 | Saunders et al. | 165/29 |

Primary Examiner—Harry Tanner
Attorney, Agent, or Firm—David L. Adour

[57] ABSTRACT

An apparatus and method is disclosed for regulating delay periods in the operation of an air conditioning system. A speedup means is provided for a serviceman to speed up the delay intervals to avoid long waiting periods between modes of operation of the air conditioning unit. Means are provided for removing the speedup means after delay periods have occurred to prevent inadvertent operation of the air conditioning system with shortened delay intervals.

9 Claims, 6 Drawing Figures

TIMER SPEEDUP FOR SERVICING AN AIR CONDITIONING UNIT WITH AN ELECTRONIC CONTROL

BACKGROUND OF THE INVENTION

1. Field of the Invention

The present invention relates to control apparatus and a method of operation of an air conditioning system. More specifically, the present invention concerns providing means for selectively reducing delay periods regulated by an electonic control to enable a serviceman to cycle an air conditioning unit between various modes of operation without waiting for the full delay periods.

2. Description of the Prior Art

Air conditioning systems as used herein refers to systems for heating, cooling, ventilating, humidifying, dehumidifying and cleaning air that may be circulated to a space or utilized in a process. In certain types of air conditioning systems delay intervals between different modes of operation are deemed desirable. In an air conditioning system including a refrigeration circuit which may be reversible for supplying heating and cooling to a space it has been found desirable to incorporate delay periods when switching between various modes of operation.

Specifically, delays may be utilized between intervals for defrosting the heat pump system and operating in the heating mode of operation. These delays may be both a minimum time between defrost cycles and a maximum time between defrost cycles. A short cycling delay to prevent the air conditioning compressor from repeated startups and shutdowns may involve a delay interval after the operation cycle during which the compressor may not be energized.

Other delays include delays for determining current reference values after startup to assure the system has settled into steady state operation. Another delay such as delaying for a period after startup before determining low current may also be utilized.

A serviceman in diagnosing any potential problems with an air conditioning unit may desire to operate the unit to determine what malfunction, if any, is present. The serviceman will typically desire to operate the unit in various modes of operation. As the unit is operated in the selected modes the delay periods provided when switching between modes of operation will occur. It is wasteful of the serviceman's time to have him wait for five or ten minutes or as much as six hours between defrost cycles to have the delay period expire before the next mode of operation may occur or before the compressor may be restarted.

The invention as described herein discloses a jumper for generating a speedup signal to greatly decrease the length of the various delay periods such that the serviceman may quickly observe the unit running in different modes of operation.

SUMMRY OF THE INVENTION

It is an object of the present invention to provide a control for an air conditioning unit.

It is a further object of the present invention to provide a speedup means for decreasing delay periods built into an air conditioning unit control.

It is another object of the present invention to provide a method for the air conditioning serviceman to override delay periods built into a unit control.

It is a further object of the present invention to provide a safe, economical, efficient and reliable method of operating and servicing an air conditioning unit.

As set forth in the preferred embodiment, the method of operating an air conditioning system incorporates a microprocessor control for regulating operation of the unit including for regulating delay intervals when switching between various operations of the unit. The method of operation includes delaying for selected time intervals when switching between various operations of the air conditioning unit, generating a speedup signal when it is desired to decrease the length of the time delay intervals, sensing the speedup signal and modifying the step of delaying in response to the speedup signal to decrease the selected time intervals between operations of the air conditioning unit. The method further includes discontinuing the step of modifying the delay intervals after the air conditioning unit has been switched between separate operations such that the delay intervals are modified only during service operations. The apparatus utilized may include a jumper means for connecting two terminals of the microprocessor to generate the speedup signal.

DESCRIPTION OF THE PREFERRED EMBODIMENT

The apparatus and method as described herein will refer to a microprocessor control for use with a reversible refrigeration circuit. It is to be understood that this microprocessor control will have like application to other types of air conditioning systems including furnaces, air conditioning systems for supplying only cooling and other heat generating equipment.

The apparatus as described herein is utilized to selectively regulate various delay periods as desired in an air conditioning unit. It is to be understood that the delay period selected and the amount of speedup for service purposes required are design choices for the particular application. It is also to be understood that the specific means of indicating a signal to provide for a speedup function is also a choice based upon the specific application.

Figure 1:
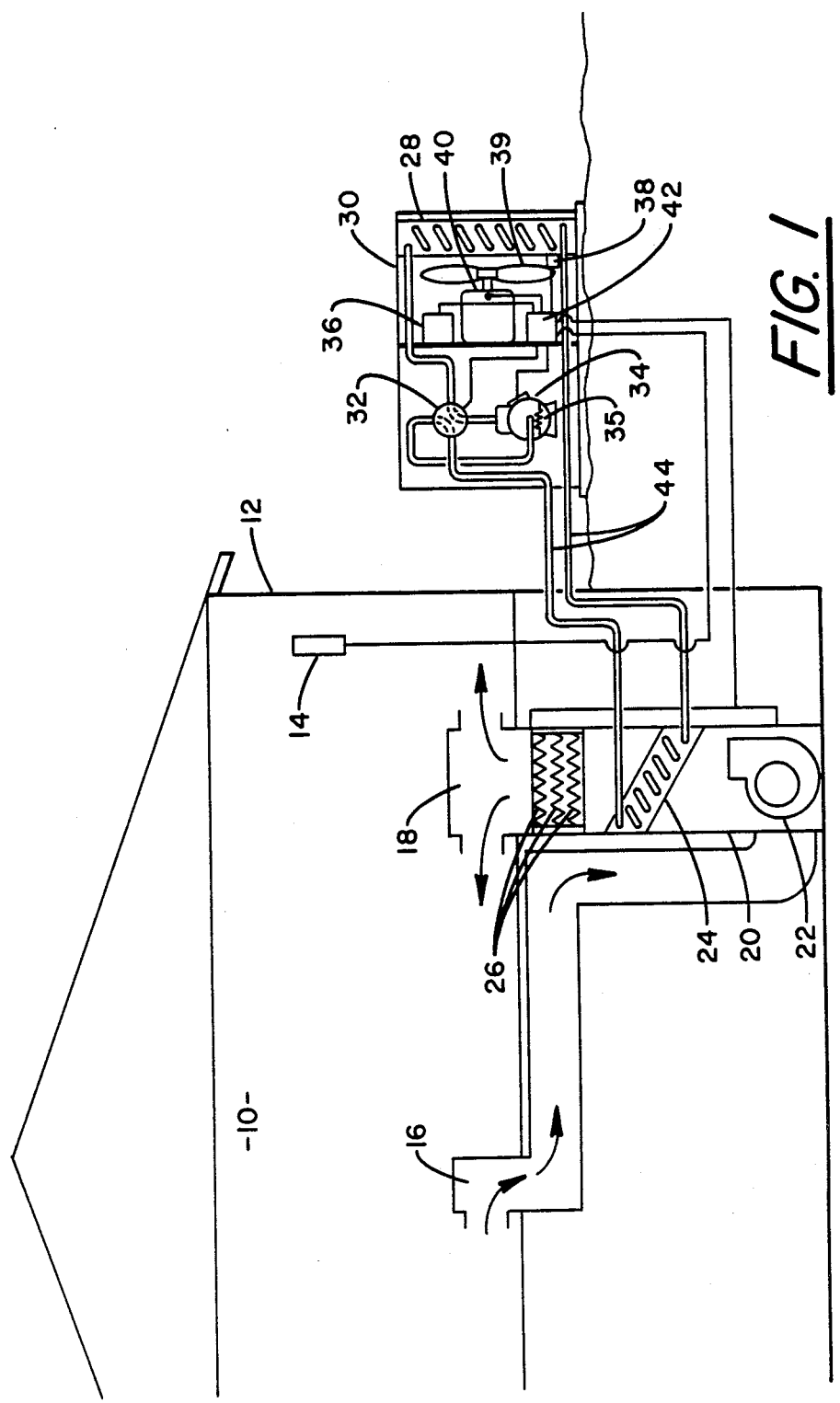
FIG. 1 is a schematic representation of a split heat pump system incorporated into a residential building.

Referring first to FIG. 1 there can be seen a schematic representation of a heat pump system. Residence 10 is shown having fan coil unit 20 located therein for circulating conditioned air within the house. Supply air duct 16 is shown directing air from the enclosure to fan coil unit 20 and return air duct 18 is shown for directing air from the fan coil unit back to the enclosure. Within the fan coil unit 20 may be seen indoor fan 22, indoor heat exchanger 24 and strip heaters 26. Indoor fan 22 acts to circulate the air through the supply duct, through the indoor heat exchanger and strip heaters and back through the return air duct to the enclosure. Indoor heat exchanger 24 is part of a refrigeration circuit and acts to either discharge heat to the air stream directed thereover via indoor fan 22 or to absorb heat energy therefrom. Strip heaters 26 are located downstream from indoor heat exchanger 24 and may be selectively energized to supply heat energy to the air stream flowing through the fan coil unit.

Outdoor unit 30 is shown located exterior of residence 10 and is typically mounted on a pad located adjacent thereto. Within outdoor unit 30 may be seen outdoor coil 28 of the refrigeration circuit, compressor 34 and reversing valve 32. Additionally, there can be seen outdoor fan 39 connected to outdoor fan motor 40 for circulating ambient air over outdoor coil 28. Outdoor temperature sensor 36, outdoor coil temperature senser 38, crankcase heater 35 and control 42 are also indicated to be within the outdoor unit. Likewise, thermostat 14 as well as electrical connections to strip heaters and the indoor fan motor for powering indoor fan 22 are designated.

The refrigeration circuit is made up of indoor coil 24, outdoor coil 28, compressor 34, reversing valve 32 and interconnecting piping 44. Expansion devices for accomplishing pressure drops between components of the refrigeration circuit are not shown.

During operation of this unit in the heating season, heat energy is absorbed in the outdoor coil 28 acting as an evaporator and discharged to indoor air via indoor heat exchanger 24 serving as a condenser. In the cooling mode of operation the reversing valve is switched such that hot gaseous refrigerant from the compressor is directed first to the outdoor coil 28 serving as a condenser and then directed to the indoor coil 24 serving as an evaporator for absorbing heat energy from the indoor air.

Figure 2:
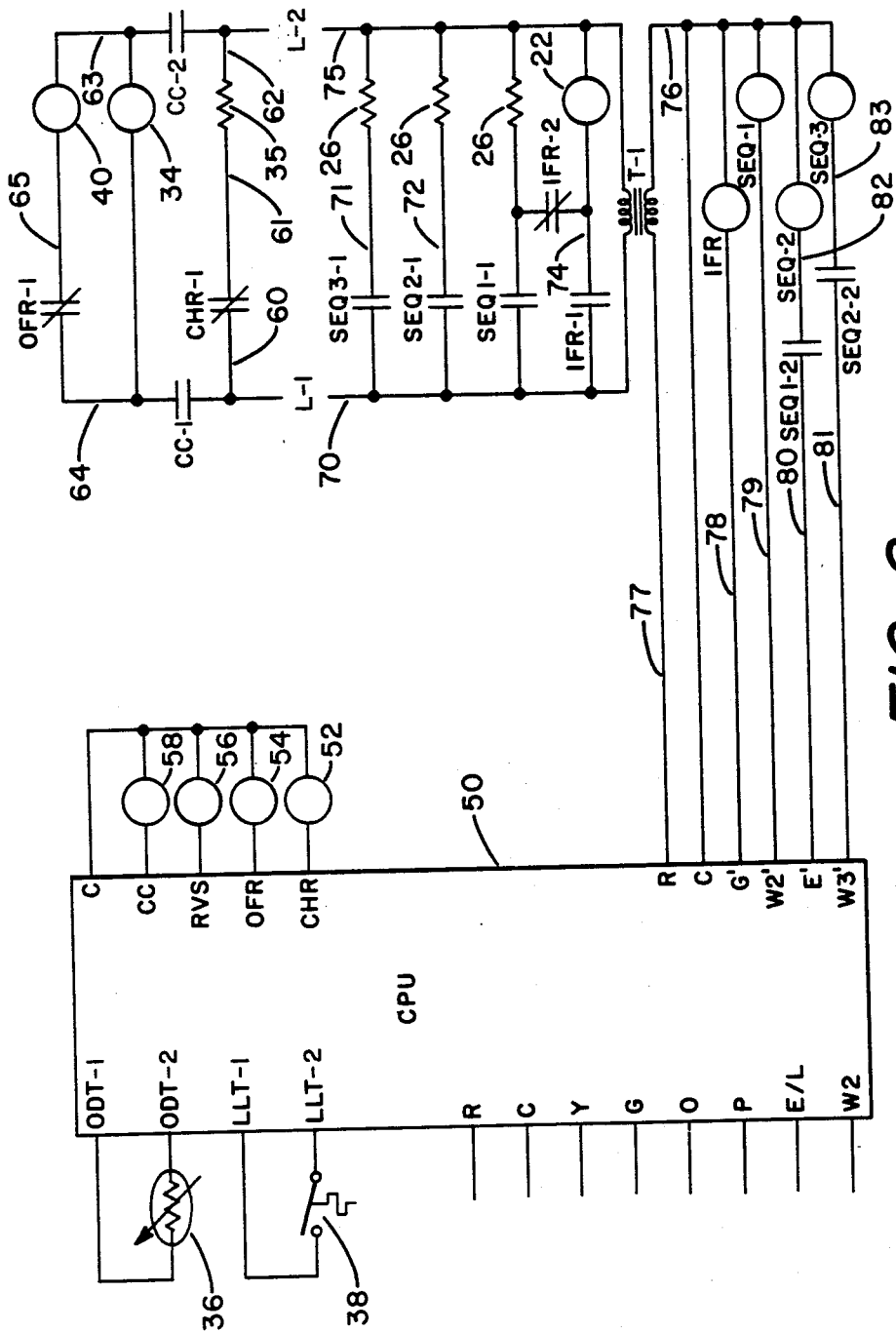
FIG. 2 is a schematic wiring diagram of the controls of the heat pump system.

Referring now to FIG. 2, there can be seen a schematic representation of the control system of this unit. In the left hand portion of FIG. 2 is shown, greatly enlarged, a central processing unit 50. Typically, this would be a commercially available microprocessor such as a Mostek 3870. It can be seen that the microprocessor has a plurality of inputs and outputs. Starting from the top left it can be seen that outdoor air temperature sensor 36 is connected through ODT-1 and ODT-2 to the central processing unit. Additionally, outdoor coil temperature sensor 38 is shown connected to the CPU through LLT-1 and LLT-2. Thereafter, a series of eight thermostat inputs labeled R, C, Y, G, O, P, E/L and W-2 are shown entering the central processor unit. In sequential order, these thermostat inputs are as follows: R-Power to the thermostat from the CPU; C-Common; Y-First stage heating; G-Energize indoor fan relay; O-First stage cooling (reversing valve); P-Power to the central processing unit from the thermostat; E/L-Emergency heat or fault light; W-2-Second stage heat.

On the right hand side of the central processing unit there may be seen connections to various relays. Crankcase heater relay 52, outdoor fan relay 54, reversing valve solenoid relay 56 and compressor contactor 58 are all shown connected to the appropriate compressor, reversing valve solenoid, outdoor fan relay, and crankcase heater relay connections of CPU 50. The CPU is programmed such that upon an appropriate set of inputs being sensed these relays will be energized.

At the bottom right hand side of the central processing unit 50 there are shown six connection points labeled respectively R, C, G', W-2', E' and W-3'. In order, these connections are R-Power, C-Common, G'-Indoor fan relay, W-2'-First stage heat, E'-Second stage heat and W-3'-Third stage heat. As can be seen in FIG. 2, the R connection is connected via wire 77 to one side of transformer T-1. The C connection is connected via wire 76 to the other side of transformer T-1. G' is connected via wire 78 to indoor fan relay IFR. Wire 79 connects W-2' to sequence relay SEQ-1. The E' terminal is connected via wire 80 to first sequence relay contacts SEQ1-2 which are connected by wire 82 to second sequence relay SEQ-2. Contact W-3' is connected via wire 81 to second sequence relay contacts SEQ2-2 which are connected by wire 83 to third sequence relay SEQ-3.

As shown in FIG. 2, lines L-1 and L-2 supply power to the fan coil unit and CPU. Line L-1, designated wire 70, is connected to normally open first sequence relay contacts SEQ1-1, normally open second sequence relay contacts SEQ2-1, to normally open third sequence relay contacts SEQ3-1, to normally open indoor fan relay contacts IFR-1 and to transformer T-1. Line L-2, designated as 75, is connected to heaters H1, H2 and H3, all designated as 26, to transformer T-1 and to indoor fan motor 22. Wire 71 connects normally open third sequence relay contacts SEQ3-1 to heater H3. Wire 72 connects normally open second sequence relay contacts SEQ2-1 to heater H2. Wire 73 connects normally open first sequence relay contacts SEQ1-1 to heater H1 and to normally closed indoor fan relay contacts IFR-2. Wire 74 connects normally open indoor fan relay contacts IFR-1 and normally closed indoor fan relay contacts IFR-2 to indoor fan motor 22.

Power wiring of the outdoor unit may be seen in the top portion of FIG. 2. Therein connected between power lines L-1 and L-2 is wire 60 connected to normally open compressor contacts CC-1 and to normally closed crankcase heater relay contacts CHR-1. Wire 61 connects normally closed crankcase heater relay contacts CHR-1 with crankcase heater CCH (35). Crankcase heater 35 is connected via wire 62 to line L-2 and to normally open compressor contactor contacts CC-2. Wire 64 connects normally open compressor contactor contacts CC-1 to normally closed outdoor fan relay contacts OFR-1 and to compressor motor 34. Wire 65 connects normally closed outdoor fan relay contacts OFR-1 to outdoor fan motor 40. Normally open compressor contactor contacts CC-2 are connected via wire 63 to compressor motor 34 and to outdoor fan motor 40.

Figure 3:
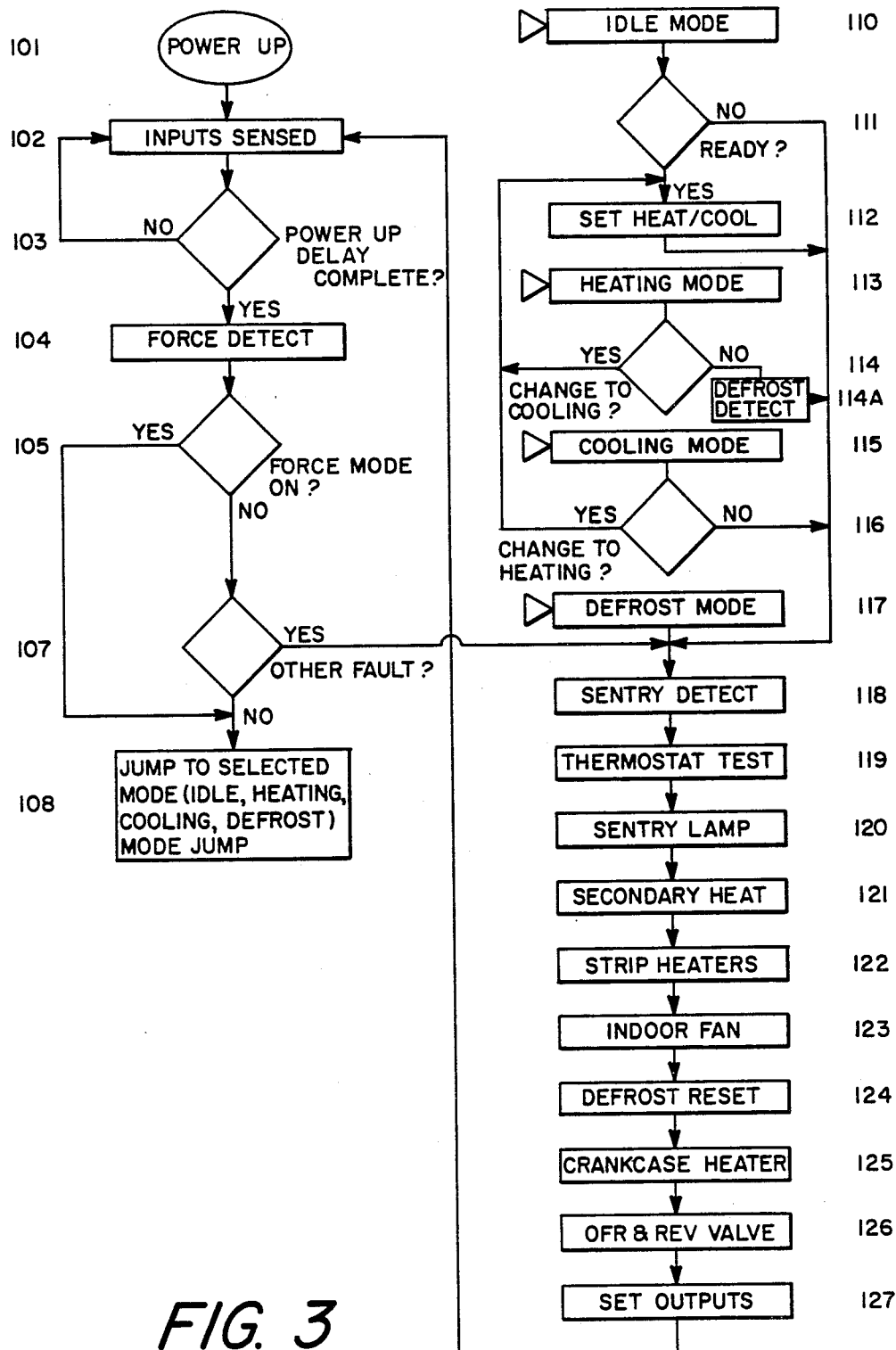
FIG. 3 is a flow diagram of the summary of the operation of a microprocessor control for the heat pump system.

FIG. 3 is a flow chart indicating the overall operation of the control system. It can be seen that the overall system control is obtained by logic flow through a series of logic steps. Each logic step may represent a subroutine or series of steps omitted for clarity in this overall chart. The initial step 101 is the powerup of the unit upon energization. Thereafter at step 102 the various inputs are sensed. To make sure the inputs are stabilized and debounced a powerup delay occurs before proceeding to force detect step 104. If the powerup delay is not complete then there is a reversion to the step of sensing inputs until said delay is accomplished. Force detect, step 104, determines whether or not the compressor is operating when it is not supposed to be. This step would detect a condition such as a contactor welded closed energizing the compressor when the various inputs are calling for the compressor to be deenergized. Step 105 determines whether the force mode is detected. If the force mode is detected then the program skips to step 108 wherein the logic jumps to the selected mode. If, in step 105, the force mode is not detected then the logic proceeds to step 107. At step 107 there is a determination whether there is another fault in the system. If there is no other fault the logic proceeds to step 108, the jump to the selected mode, one of the modes of idle, heating, cooling or defrost. If another fault is detected then the control logic jumps to step 118, sentry detect.

If in step 108 the jump is selected to the idle mode then the logic proceeds to step 110. Thereafter, at step 111, a ready determination is made and if the answer is no the logic jumps to step 118 without placing the unit in heating or cooling. If the answer to step 111 is yes the logic proceeds to step 112 and the air conditioning unit is placed in heating or cooling in step 112. The logic then jumps to step 118.

If the jump to the selected mode selects the heating mode then the jump is made to step 113. Once operation is in the heating mode the question of should operation be changed to cooling is continually answered at step 114. If the answer is yes, the logic is cycled back to step 112 of setting the unit in heat or cool and if the answer is no logic operation proceeds to step 114A, defrost detect. If a need for defrost is detected the logic changes the mode from heating to defrost and then jumps to step 118. If a need for defrost is not detected the logic does not change the mode and then jumps to step 118.

If in step 108 the selection is the cooling mode then the logic proceeds to step 115. Step 116 continually questions if operation should be changed to heating. If the answer is yes the control sequence proceeds back to the step 112 of setting the unit for heating or cooling. If the answer is no the logic jumps to step 118.

The fourth mode jump is to the defrost mode, step 117. This step in the logic either continues or cancels the defrost mode of operation. If the jump is made to the defrost mode thereafter the logic proceeds through the entire control sequence. From the defrost mode the control sequence includes the steps of sentry detect 118, thermostat test 119, sentry lamp 120, secondary heat 121, strip heaters 122, indoor fan 123, defrost reset 124, crankcase heater 125, OFR plus REV valve 126 and set outputs 127. From the step of set outputs 127 the control sequence reverts to step of inputs sensed (102).

The sentry detect step acts to check the compressor for low current or for ground fault indication. The thermostat test checks to make sure the inputs from the thermostat are in a legal pattern. The sentry lamp step acts to blink a thermostat lamp to indicate various fault modes. Secondary heat controls the W-2 output from the central process unit. The step of strip heaters 122 control the E' and W-3' outputs from the central processing unit. Indoor fan step 123 controls indoor fan 22. Defrost reset determines when a defrost timer for controlling the length of defrost needs to be reinitialized. Crankcase heater, step 125, acts to control the crankcase heater operation. OFR plus REV valve, step 126, acts to control the outdoor fan relay and the reversing valve relays under the appropriate conditions. Step 127 for setting the outputs turns on and off the central processing unit outputs and detects when the compressor is changing state.

Figure 4:
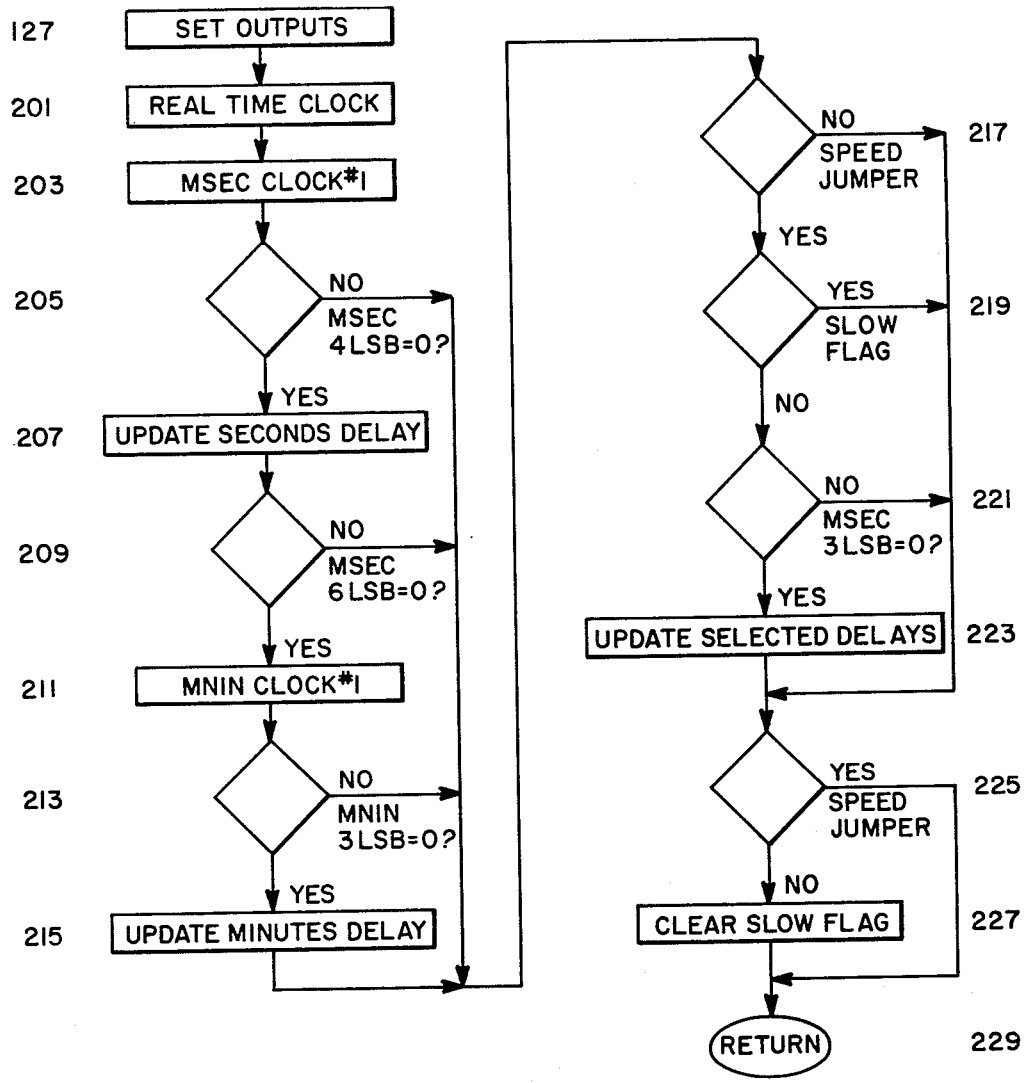
FIG. 4 is a flow chart showing the timing function for regulating the delays in the heat pump system.

Referring now to FIG. 4 there may be seen a flow chart indicating the operation of the timing function of the microprocessor control. It may be seen that logic flows from set outputs step 127 to real time clock step 201. From step 201 the logic flows to step 203 where MSEC clock plus 1 increments to count the pulses emitted by the real time clock. This real time clock typically operates off the frequency of the power supply such that with a 60 hertz power supply a pulse is emitted 60 times a second. In step 203 the MSEC clock is incremented one for each pulse emitted by the real time clock. At step 205 the logic determines whether the four least significant bits of the MSEC register are equal to zero. In other words, at step 205 it is determined whether or not the four least significant digits of the binary number in the register equal zero. If the answer is no the logic proceeds to step 217. If the answer is yes, which will occur once every 16 pulses, then the logic proceeds to step 207 to update the seconds delays. Hence, all delay intervals done in seconds are incremented by one for each 16 pulses emitted by the real time clock in step 201.

The logic then proceeds to step 209 where the question of whether or not the binary number in the MSEC register has its six least significant bits equal to zero. If the answer is no the logic proceeds to step 217. If the answer is yes indicating that the six least significant bits of binary number are equal to zero which will occur once every sixty-four clock pulses or once every sixty-four/sixty seconds (assuming a 60 hertz power supply) then in that event the logic proceeds to step 211 where the MMIN clock is incremented by one.

In step 213 it is determined whether or not the binary number in the MMIN register has its three least significant bits equal to zero. If the answer is no the logic proceeds to step 217. If the answer is yes which will occur once every eight pulses received from the MMIN clock or once every 512/60 seconds or approximately once every eight seconds then the logic proceeds to step 215 to update the minute delays.

From step 215 the logic proceeds to step 217 to determine whether or not the speed jumper is in place. The speed jumper as referred to herein is an electrical connection between pin 37 of the microprocessor control and another pin of the microprocessor. This jumper may be a wire inserted by the serviceman or may be a built in connection attached to the microprocessor control having a button which is depressed by the serviceman to make contact between the pin and ground. The jumper may also be a permanent wired jumper supplied with the microprocessor such that the serviceman would remove and reinstall the jumper to generate the speedup signal. The pin must be connected to another pin for an interval long enough to be detected. If the speed jumper is not detected the logic proceeds to step 225. If the speed jumper is detected the logic proceeds to step 219. Step 219 questions whether or not a slow flag indicator has been set. If the answer is yes indicating it is not desirable to operate the air conditioning unit in the speeded up condition the logic proceeds to step 225. If the answer is no at step 219 the logic then proceeds to step 221 wherein the question is asked whether or not the binary number in the MSEC register has its three least significant bits equal to zero. Hence, if the answer to this question is no the logic proceeds to step 225. If the answer is yes which will occur every eight/sixty seconds then the selected delays are updated at that interval.

It can be seen at step 223 that selected delays are updated every eight/sixty seconds. This is the speedup update period. At step 213 some of the same delay periods are updated in response to 512/60 second intervals. Hence, when updated at step 223 the delay period elapses sixty-four times faster than the delay period if no speedup jumper were present.

From step 223 the logic proceeds to step 225 where again the question of whether or not the speedup jumper is present is asked. If the answer is yes the logic proceeds to step 229. If the answer is no the logic proceeds to step 227 and the slow flag is cleared. From there the logic proceeds to return step 229 from which the logic returns back to step 102 for sensing inputs as shown in FIG. 3.

Figure 5:
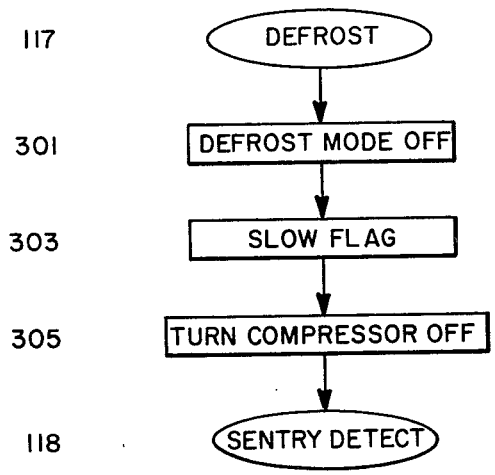
FIG. 5 is a flow chart of a subroutine for a mode of operation of the heat pump system.

FIG. 5 discloses a typical subroutine for a method of operation of an air conditioning unit. From defrost step 117 the logic flows to step 301 to the defrost mode off position, to step 303 to set the slow flag, to step 305 to turn the compressor off and to step 118 sentry detect. This subroutine is shown in a sketchy manner to indicate that as the system switches to the defrost mode being off, the slow flag is set to indicate that the air conditioning system has switched between modes of operation. Hence, since the slow flag has been set the speedup function, as outlined in FIG. 4, may not occur.

Figure 6:
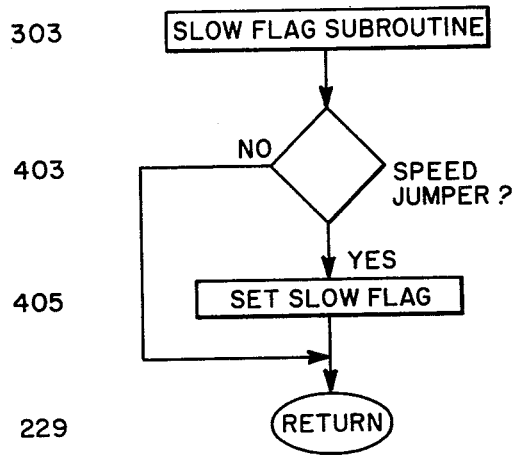
FIG. 6 is a flow chart of a subroutine for generating an indicator to prevent short delay operation.

As can be seen in FIG. 6 the slow flag subroutine is disclosed. From therein it can be seen that at step 401 the subroutine commences. The logic flows from step 401 to step 403 to determine whether or not the speed jumper is in place. If the answer is yes the slow flag is set and the logic proceeds to return, step 229. If the answer to whether or not the speed jumper is present is no the logic proceeds directly to step 229. The logic proceeds to slow flag subroutine as indicated at step 303 when as in FIG. 5, the slow flag is indicated to be set. In other words, at step 303 in FIG. 5, when the defrost mode cycles off, the logic proceeds to set the slow flag jumping to the slow flag subroutine to determine whether or not the speed jumper is present and if the answer is yes, the slow flag is set. If the answer is no, no slow flag is set.

OPERATION

If the serviceman desires to monitor the various modes of operation in the air conditioning unit the speed jumper is set. As shown in FIG. 4, if no slow flag is present this operates to accelerate the delay intervals by a factor of 64. Hence in the speedup mode, a ten minute delay will take roughly ten seconds to elapse before the unit switches to the next mode of operation.

As indicated in FIG. 5, there are various modes of operation during which, once the mode of operation of the air conditioning unit has switched, it is desirable to set a slow flag to prevent further speedup of delay intervals if the speed jumper is placed as indicated in FIG. 6. Hence, if the compressor is energized or de-energized or if defrost is initiated or terminated, or if the unit is "powered up", in any of the above events there would be a logic step for jumping to the slow flag subroutine to determine whether or not to set a slow flag.

This operation acts to allow the serviceman to install the speed jumper and to have only the next delay period of the air conditioning system be shortened. Once the compressor is energized or if defrost is initiated the slow flag is set if the speed jumper is present. Hence, only the next specific delay interval is shortened and the unit then resumes normal operation. If the serviceman wishes to speed up the following delay interval he will required to reset the speed jumper.

By requiring that the speed jumper be separately set for each test operation, the logic provides a safety feature should the speed jumper be inadvertently set or inadvertently left in place. The speed jumper will only act to speed up one delay interval and thereafter the delay intervals continue as if no speed jumper were in place. It may also be seen, as set forth in the logic herein, the only occasion in which the slow flag can be set is when the speed jumper is in place. If the speed jumper is not in place then no slow flags are set and the speedup logic is avoided. Once the slow flag is set and the speed jumper is removed then the slow flag is cleared at step 227.

The invention has been described herein with reference to a particular embodiment. It is to be understood by those skilled in the art that variations and modifications can be effected hereto within the spirit and scope of the invention.

What is claimed is:

1. A method of operating an air conditioning system incorporating a microcomputer control for controlling operation of the system including switching the air conditioning system between various modes of operation, which comprises the steps of:

delaying operation of the air conditioning system for selected delay time intervals of varying lengths when switching between certain of the various modes of operation of the air conditioning system;

generating a speedup signal when it is desired to decrease the length of a delay time interval;

sensing the occurrence of the speedup signal;

modifying the operation of the air conditioning system to decrease the length of only the first delay time interval extending after the occurrence of the speedup signal is sensed; and discontinuing the step of modifying when the air conditioning system is switched between modes of operation to return the air conditioning system to normal operation even though further occurrences of the speedup signal are sensed.

2. The method as set forth in claim 1 wherein the step of generating a signal comprises:

connecting two pins of the microcomputer control.

3. The method as set forth in claim 1 wherein the air conditioning unit includes a refrigeration circuit with a compressor and may be operated with a defrost initiation delay, a defrost timer delay, a defrost termination delay and a short cycling delay; wherein the step of delaying for selected time intervals acts to achieve each delay and wherein the step of discontinuing the step of modifying includes discontinuing when the compressor is energized or de-energized or defrost is initiated or terminated.

4. The method as set forth in claim 1 wherein the microcomputer control includes a clock for emitting periodic pulses, wherein the step of delaying for selected time intervals comprises:

decrementing a delay interval for each delay period at a first rate as a function of the number of clock pulses emitted; and wherein the step of modifying includes decrementing the delay interval at a second rate faster than the first rate as a function of the number of clock pulses emitted.

5. The method as set forth in claim 1 wherein the step of discontinuing includes:

setting a slow speed indicator when the air conditioning unit switches between operations;

detecting if the slow speed indicator has been set; and
preventing the step of modifying if the slow speed indicator is detected.

6. The method as set forth in claim 5 and further including the step of:
clearing the slow speed indicator when the step of sensing does not detect the speedup signal.

7. Apparatus for operating an air conditioning unit including a refrigeration circuit with a compressor and a microcomputer control which comprises:
means for determining delay periods between various operating sequences of the air conditioning unit;
jumper means for generating a speedup signal;
detection means for determining the occurrence of a speedup signal;
means for modifying the operation of the air conditioning unit to decrease the length of only the first delay period extending after the occurrence of the speedup signal is detected; and
means for returning the air conditioning unit to normal operation when the air conditioning unit is switched between operating sequences even though further occurrences of the speedup signal are detected by the detection means.

8. The apparatus as set forth in claim 7 wherein the microcomputer includes a clock for emitting periodic pulses and wherein the means for determining delay periods detects said pulses and decrements a timer at a predetermined rate in response to said pulses detected.

9. The apparatus as set forth in claim 7 wherein the means for returning the air conditioning unit to normal operation comprises:
means for generating an indicator in response to specific operations of the air conditioning unit; and
override means responsive to the means for generating an indicator to prevent the means for modifying the operation of the air conditioning unit from being energized notwithstanding further occurrences of the speedup signal being detected by the detection means.

* * * * *